US009228889B2

(12) United States Patent
McCann

(10) Patent No.: US 9,228,889 B2
(45) Date of Patent: Jan. 5, 2016

(54) DETECTION OF DEPOSITS IN FLOWLINES

(75) Inventor: Dominic McCann, Romsey (IE)

(73) Assignee: Schlumberger Technology Corporation, Houston, TX (US)

( * ) Notice: Subject to any disclaimer, the term of this patent is extended or adjusted under 35 U.S.C. 154(b) by 816 days.

(21) Appl. No.: 12/866,823

(22) PCT Filed: Feb. 4, 2009

(86) PCT No.: PCT/US2009/032997
§ 371 (c)(1),
(2), (4) Date: Mar. 7, 2011

(87) PCT Pub. No.: WO2009/100087
PCT Pub. Date: Aug. 13, 2009

(65) Prior Publication Data
US 2011/0185815 A1    Aug. 4, 2011

(30) Foreign Application Priority Data

Feb. 8, 2008 (GB) .................................. 0802360.8

(51) Int. Cl.
*G01H 9/00* (2006.01)
*G01H 3/04* (2006.01)
*G01H 3/10* (2006.01)

(52) U.S. Cl.
CPC ..................... *G01H 9/004* (2013.01)

(58) Field of Classification Search
CPC ................................................. G01H 9/004
USPC .......................................................... 73/592
See application file for complete search history.

(56) References Cited

U.S. PATENT DOCUMENTS

| 3,409,897 | A |   | 11/1968 | Bosselaar et al. |
|---|---|---|---|---|
| 5,205,165 | A |   | 4/1993 | Jardine et al. |
| 5,845,033 | A | * | 12/1998 | Berthold et al. ................ 385/12 |
| 5,992,250 | A |   | 11/1999 | Kluth et al. |
| 6,271,766 | B1 | * | 8/2001 | Didden et al. ............. 340/853.1 |
| 6,550,342 | B2 | * | 4/2003 | Croteau et al. .................. 73/800 |
| 6,567,006 | B1 |   | 5/2003 | Lander et al. |
| 6,644,848 | B1 | * | 11/2003 | Clayton et al. ..................... 374/7 |
| 6,817,257 | B2 |   | 11/2004 | Kluth et al. |
| 6,913,079 | B2 | * | 7/2005 | Tubel ....................... 166/250.01 |
| 6,965,320 | B1 |   | 11/2005 | Casey et al. |
| 7,237,950 | B2 | * | 7/2007 | Shioji et al. .................... 374/161 |
| 7,946,341 | B2 | * | 5/2011 | Hartog et al. ............... 166/254.1 |

(Continued)

FOREIGN PATENT DOCUMENTS

FR           2754898  A1 *  4/1998
JP        2000329031  A  * 11/2000

OTHER PUBLICATIONS

International Search Report PCT/US2009/032997 mailed Mar. 13, 2009.

*Primary Examiner* — Hezron E Williams
*Assistant Examiner* — Nashmiya Fayyaz
(74) *Attorney, Agent, or Firm* — Chamberlain Hrdlicka

(57) ABSTRACT

A method 2 of determining the location of deposits in a flowline comprises providing 4 a distributed vibration sensor along the flowline, measuring 6 vibrations along the flowline with the sensor and analyzing 8 the measured vibrations to determine the location of any deposits. The vibration measurements are made using a distributed fiber optic sensor provided on the flowline. The measurements are analyzed in real time to identify deposit formation and location within the flowline.

9 Claims, 3 Drawing Sheets

(56) References Cited

U.S. PATENT DOCUMENTS

| | | | |
|---|---|---|---|
| 8,131,121 B2* | 3/2012 | Huffman | 385/12 |
| 2005/0149264 A1* | 7/2005 | Tarvin et al. | 702/6 |
| 2005/0283276 A1 | 12/2005 | Prescott et al. | |
| 2006/0065393 A1* | 3/2006 | Williams et al. | 166/250.03 |
| 2006/0151042 A1* | 7/2006 | Stringfellow et al. | 138/125 |
| 2006/0165344 A1* | 7/2006 | Mendez et al. | 385/13 |
| 2006/0225507 A1 | 10/2006 | Paulson | |
| 2008/0264495 A1* | 10/2008 | Ramachandran et al. | 137/171 |
| 2009/0279583 A1* | 11/2009 | Hampson et al. | 374/131 |
| 2011/0088910 A1* | 4/2011 | McCann et al. | 166/344 |

* cited by examiner

DETECTION OF DEPOSITS IN FLOWLINES

CROSS-REFERENCE TO RELATED APPLICATIONS

The present Application is a U.S. National Phase of PCT/US2009/032997 of MCCANN, entitled "Detection of Deposits in Flowlines", filed on 4 Feb, 2009("the PCT Application"). The PCT Application claims benefit of priority to GB Application Serial. No. 0802360.8 filed on Feb. 8, 2008, the entire contents of all of which are hereby incorporated by reference herein.

TECHNICAL FIELD

The present invention relates to a method of determining the location of deposits in flowlines in the oil and gas industry and particularly, but not exclusively to a technique that can be used in real time or quasi-real time.

BACKGROUND ART

Subsea production of oil and gas is projected to increase significantly in the next 5-10 years. However, producing oil and gas from floating production platforms (FPSO) presents many challenges which increase as the water depth increases. The fluids produced from the wellheads on the seabed are typically transferred to the FPSO through flexible flowlines (also known as risers or pipelines). However, because the temperature of the fluid in the flowline can change as flow conditions change, waxes or hydrates can deposit on the inside of the flowlines. In particular, when production is stopped, the temperature of the fluid in the line will decrease as a result of heat loss to the surrounding, cooler sea water. The fluid condition can thus enter a state which triggers hydrate formation.

The conditions for deposit formation are typically anticipated through computer modeling of the flowline using expected environmental conditions, such as temperature and pressure, together with thermodynamic modeling of the fluids being transported. One industry accepted flow modeling package is OLGA from SPT Group. This modeling package is used during the design and operation phases of a flowline. It relies heavily on estimates of expected operating conditions and flowing fluid properties. These are not always well known and so unexpected deposition may occur.

It is not uncommon for deposition to go undetected until flow is completely blocked or is so restricted that oil and gas production is significantly effected. Pressure and flow measurements are sometimes used but these are usually only available at discrete locations which are often separated by large distances. As result, blockage or deposit location can only be determined to within a very long section of a flowline.

In addition, it is often difficult to determine the location of deposit formation as it will depend on changes in fluid and environmental conditions along the flowline. It is also found that hydrate deposits can move through the flowline and aggregate to form a blockage at a point away from where they were first formed. If deposition is allowed to continue, the cost associated with removing the blockage can be significant. Accordingly, the sooner deposition is detected the better.

Removal of hydrate deposits is typically performed by pumping large quantities of chemicals into sections of flowlines ("chemical injection") or by sending a "pig" into the flow lines to scrape off or break up any deposits formed within the flowline. Both approaches require information about the location of the deposits to be removed in order to work effectively.

SUMMARY OF THE INVENTION

It is an object of the present invention to provide an improved method of determining the location of deposits within flowlines.

According to a first aspect of the present invention, there is provided a method of determining the location of deposits in a flowline, the method comprising:
providing a distributed vibration sensor along the flowline;
measuring vibrations along the flowline with the sensor; and,
analysing the measured vibrations to determine the location of any deposits.

In an embodiment, the method comprises providing a distributed fibre optic sensor along the flowline. The fibre optic sensor can conveniently comprise an optical fibre arranged for optical interrogation by measuring coherent Rayleigh noise (CRN) and/or Brillouin backscatter.

In an embodiment, the method comprises measuring vibrations along the flowline by launching an optical interrogation signal into the optical fibre and detecting coherent Rayleigh noise and/or Brillouin backscatter optical signals. The method may comprise launching the optical interrogation signal into the fibre from either or both distal ends of the optical fibre.

In an embodiment, the fibre optic sensor is provided clamped to the flowline. The fibre optic sensor may be provided within a wall of the flowline. In an embodiment, the fibre optic sensor is provided wound around and along a length of an outer surface of the optical fibre.

In an embodiment, method further comprises measuring temperature along the flowline with the fibre optic sensor by measuring Raman backscattered Stokes and anti-Stokes optical signals from the optical interrogation signal.

In an embodiment, the method comprises detecting changes in vibrations along a length of the flowline to detect the presence of deposits within the flowline. The changes in vibrations may be detected by monitoring the amplitude and/or frequency of the vibrations along a length of the flowline. In an embodiment, method comprises measuring and analysing vibrations continuously over a period of time so as to provide real-time detection of deposit formation. The method may comprise monitoring the changes to determine when a threshold measurement value, that is indicative of the deposit formation, has been exceeded. The method may comprise applying a Hinckley filter to the measurements to determine the changes in vibrations.

In an embodiment the flowline comprises an oil pipeline or gas pipeline.

An embodiment of the present invention will know be described by way of example only and with reference to the accompanying drawings.

BRIEF DESCRIPTION OF THE DRAINS

DESCRIPTION OF EMBODIMENTS OF THE INVENTION

Figure 1:
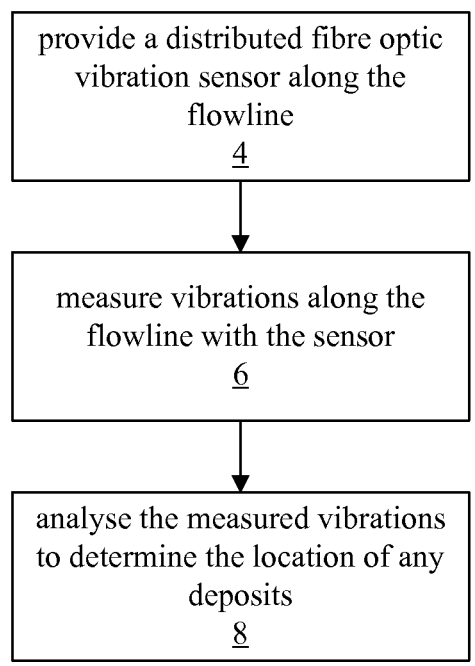
FIG. 1 is a flow diagram a method of determining the location of deposits in a flowline according to an embodiment of the present invention.

Referring to FIG. 1, an embodiment of the invention provides a method 2 of determining the location of deposits in a flowline. The method 2 comprises: providing 4 a distributed vibration sensor along the flowline; measuring $ vibrations along the flowline with the sensor; and analysing 8 the measured vibrations to determine the location of any deposits.

Figure 2:
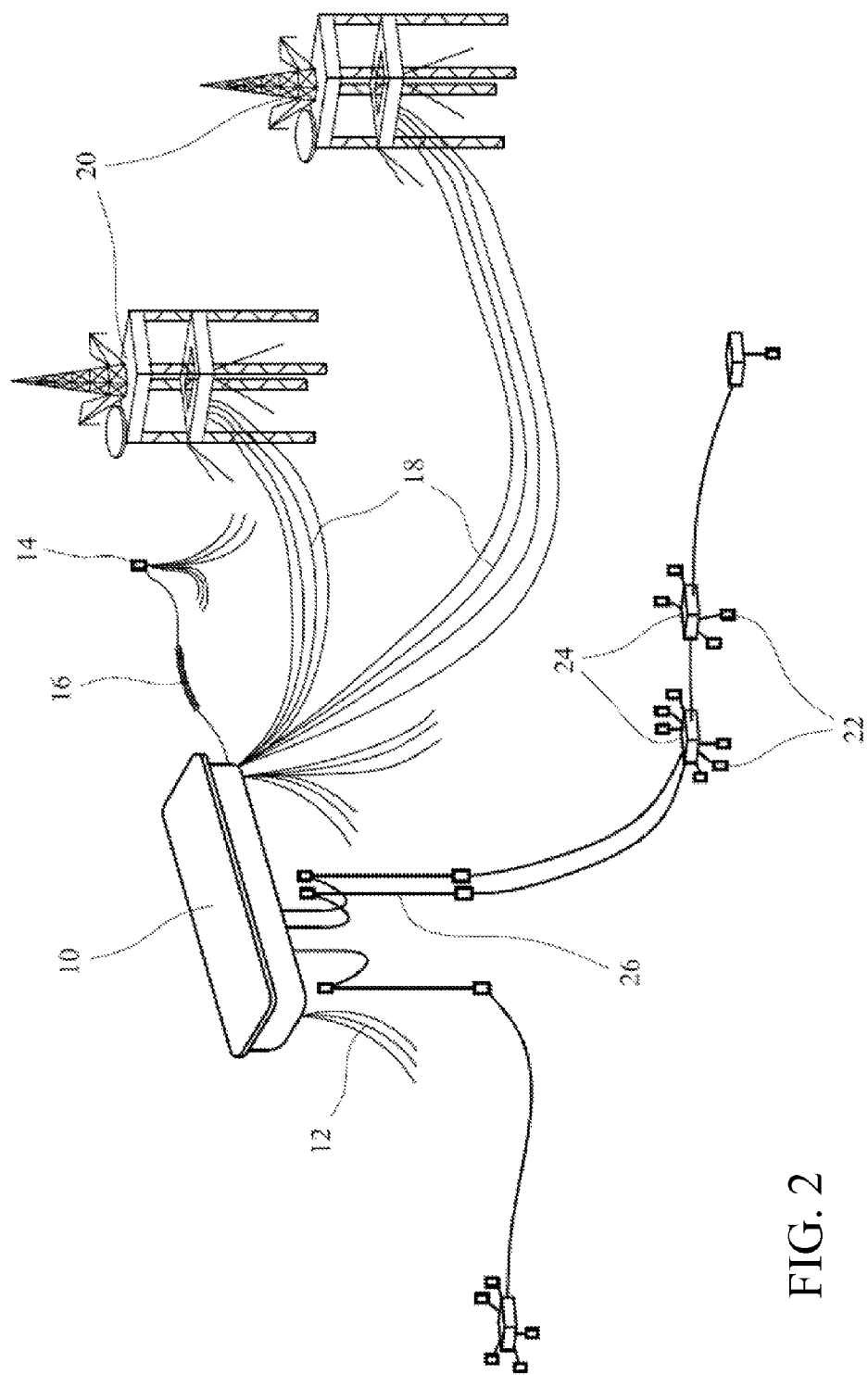
FIG. 2 is an schematic illustration of subsea system to which the method of FIG. 1 can be applied.

The method 2 is particularly applicable to monitoring subsea installations in the oil and gas industry. Referring to FIG. 2 of the drawings, there is shown a schematic illustration of a subsea system comprising a floating production platform (FPSO) vessel 10 which is anchored to the sea bed by anchor chains 12. A tanker offloading buoy 14 is connected to the FPSO 12 by means of a flexible offloading pipeline 16. Further flexible flowlines 18 connect the FPSO 10 to nearby platforms 20 to allow direct production of oil and gas to the FPSO. Also, existing subsea wells 22 have connections to subsea manifolds 24 from which flexible flowlines and risers 26 lead to connect to the FPSO 10. The embodiment of the invention further allows the monitoring of pipelines 16, flowlines 18 and risers 26 though which fluids flow, as well as structural pipes such as those used in the support structures of the platform 20. It will thus be appreciated by the person skilled in the art that the term "flowline" is herein used to mean flowlines, risers and pipelines.

Figure 3:
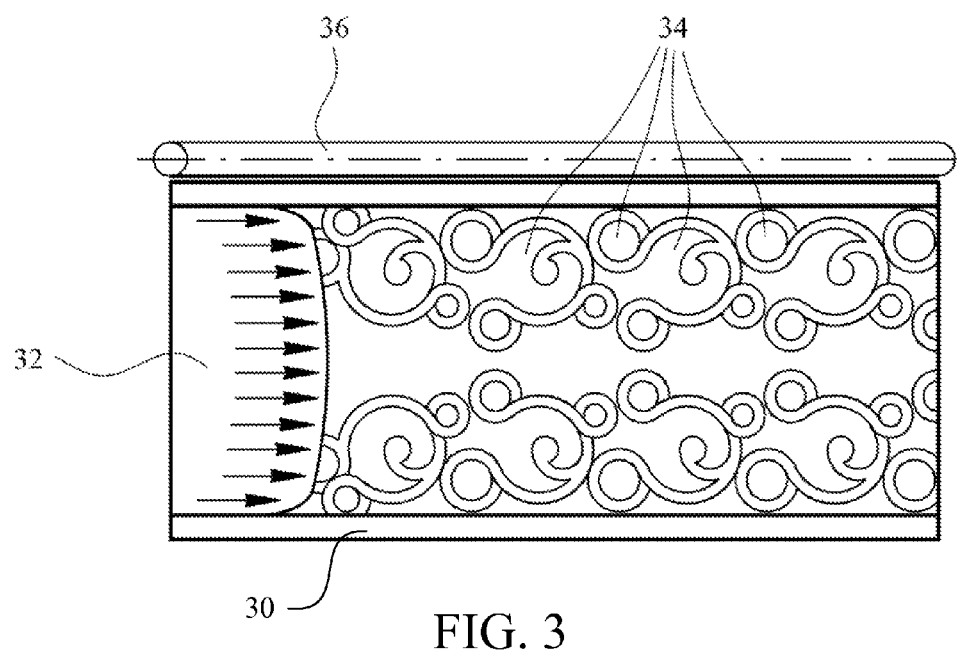
FIG. 3 is an illustration of a typical turbulent flow in a pipe.

FIG. 3 of the drawings shows a diagram of a typical turbulent flow in a pipe 30. The fluid flows in the pipe 30 with a velocity profile 32 that varies across the diameter of the pipe 30. In a turbulent flow, such as typically exists for the type of fluids and conditions which exist in subsea flowlines, naturally occurring vortices 34 exist in the pipe 30, which are carried in the flow along the pipe 30. The amplitude of these vortices increases as the internal diameter of the pipe 30 decreases, which can occur when deposits build up on the internal walls of the pipe 30, restricting the flow.

Figure 4:
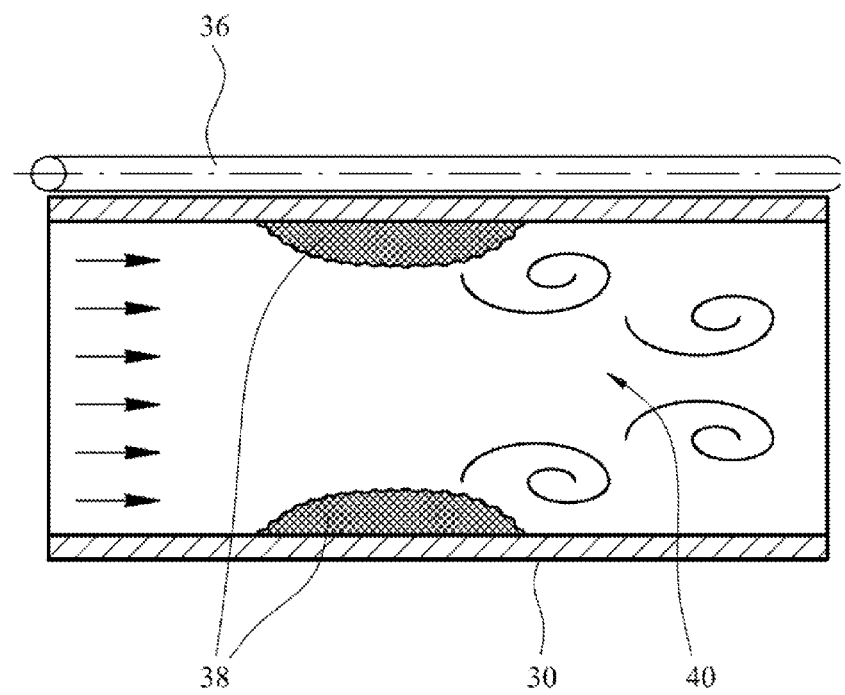
FIG. 4 is an illustration of vortex shedding near a zone of deposit build up.

A second cause of changes in vibrations near a zone of deposit build up is vortex shedding. This is shown schematically in FIG. 4 of the drawings and occurs near the deposition 38 in the pipe 30. Vortex shedding results in vortices 40 being generated downstream of the deposit 38. These vortices generate increased pressure fluctuations in the pipe 30. These noisy flow conditions result in pressure variations within the pipe 30 which generate vibrations in the pipe walls. In the limit when the deposit has built to the point where the flow is forced through a very small orifice, a high frequency noise can be generated.

In the method 2 of the embodiment, the distributed vibration sensor comprises a distributed fibre optic sensor in the form of an optical fibre 36 arranged for interrogation using coherent Rayleigh noise (CRNI), as will be described in more detail below. The fibre 36 may alternatively be arranged for interrogating using Brillouin scattering.

In the method 2 the fibre 36 is provided along the flowline 16, and in this example is provided within a cable which is clamped to the flowline 16. The method 2 may alternatively comprise providing the fibre 36 directly on the flowline 16 or embedded within the flowline. The fibre 36 is provided along the flowline 16 coiled in a helix configuration around and along a length of the flowline 16.

In the embodiment, measuring 6 vibrations within the flowline 16 is achieved by launching an optical interrogation signal into the optical fibre 36 at a distal end of the fibre. CRN optical signals generated as a result of vibrations within the flowline 16 are detected and analysed as described below. The distributed optical fibre sensor 36 may alternatively be interrogated from its other distal end or from both ends.

The interrogation of the flowline 16 using the optical fibre, that is the location of the optical interrogation signal source and optical detectors configured to detect the CRN, can take place as far as a 100 km from the location of the event in the flowline and so significant lengths of flowline can be monitored continuously in real time.

CRN within the optical fibre 36 is caused by vibrations within the flowline 16 being transmitted into the optical fibre 36. Flowline 16 vibrations are therefore measured directly using CRN. In the case of a distributed optical fibre sensor arranged for Brillouin backscatter measurements, the backscattered optical signal measures strain in the fibre caused by the vibrations in the flowline 16. Measuring the strain as a function of time, can give an indication of vibration on the fibre 36 and thus in the flowline 16.

The method 2 also determines changes in certain parameters of the vibrations measured by the fibre sensor 36, such as amplitude or frequency of these vibrations, and from the changes determines where in the flowline 16 the deposit is located and the extent of deposition.

In this embodiment, the method 2 comprises detecting changes in the parameter values using a Hinkley filter, which is a an adaptive type of filter particularly suited for detecting slow trends based on measuring cumulative deviation of the observed parameter such filter being described in U.S. Pat. No. 5,205,165 assigned to the same assignee as the present invention. Analysis of the changes can be performed in real time, quasi real time (continuous but delayed by some small amount), or in periodic intervals whereby the data is stored and analysed at some later time.

The method 2 also comprises measuring the temperature along the flowline 16 using distributed temperature sensing (DTS). The distributed temperature sensing is performed using the optical fibre 36. The method 2 additionally comprises detecting Raman backscattered Stokes and anti-Stokes wavelength optical signals generated from the optical interrogation signal to provide a distributed temperature measurement along the fibre 36.

The method 2 of the embodiment therefore uses the fibre optic 36 on the flowline 16 to detect and interpret unsteady pressure fields within the subsea flowline 16 by detecting and monitoring changes resulting changes in vibrations at the flowline walls.

Analysis of the detected vibrations can be used to detect the onset of deposition in the flowline. The interpretation of the data enables allows changes in the amplitude and/or frequency and/or other characteristics of the vibrations at the flowline walls to be determined. Real time processing of the vibration signals can provide a continuous reading of the amplitude and/or frequency and/or other characteristics of the vibrations. These can be monitored in real time to detect changes or the trends in flow parameters or to provide an indication when threshold values have been exceeded. If a threshold value is exceeded then this can be used to generate an alarm to indicate that deposition is occurring in the flowline and, because these measurements are made in a distributed fashion along the length of the flowline, the location of the build up can also be determined.

In all cases, the analysis is effectively contemporaneous with the formation of the deposit in the flowline or pipeline allowing constructive action to be taken before the deposit can create problems.

The method uses a fibre optic sensor to provide a distributed measurement system which is used to detect the onset of deposition and the location of the deposits. The method utilises a fibre optic sensor placed along a flowline that can be used in real time to determine the onset of deposition within the flowline and also the position of the deposit along the Bowline. This is important because knowing the exact the location of deposit allows treatment to be targeted, and the detection of the deposit as early as possible allows treatment to start as soon as possible before the deposit becomes substantial and leads to a blockage.

By analyzing changes in the amplitude end/or frequency and/or other characteristics of detected vibrations it is possible to determine real time changes in the vibrations. These changes can be used to detect the location in the flowline of the impending deposit buildup before blockage occurs.

The invention claimed is:

1. A method of determining locations of any deposits in a subsea flowline that includes a wall and an internal fluid passageway, the method comprising:
    providing a distributed fibre optic sensor along the subsea flowline outside of the fluid passageway, said distributed fibre optic sensor comprising an optical fibre arranged along a length of the subsea flowline;
    detecting vibrations within the wall of the subsea flowline with the fibre optic sensor by launching an optical interrogation signal into the fibre optic sensor and measuring coherent Rayleigh noise and/or Brillouin backscatter optical signals; and
    analysing the detected vibrations by monitoring amplitude and/or frequency of the vibrations along the length of the subsea flowline to determine locations of any deposits.

2. The method as claimed in claim 1, wherein the fibre optic sensor is provided clamped to the subsea flowline.

3. The method as claimed in claim 1, wherein the fibre optic sensor is provided within the wall of the subsea flowline.

4. The method as claimed in claim 1, wherein the fibre optic sensor is provided wound around and along a length of an outer surface of the subsea flowline.

5. The method as claimed in claim 1, further comprising launching the optical interrogation signal into the fibre from one or both ends thereof.

6. The method as claimed in claim 1, further comprising measuring and analysing vibrations continuously over a period of time to provide real-time detection of deposit formation.

7. The method as claimed in claim 1, further comprising monitoring changes in vibrations to determine when a threshold measurement value indicative of deposit formation has been exceeded.

8. The method as claimed in claim 1, further comprising applying a Hinckley filter to the measured coherent Rayleigh noise and/or Brillouin backscatter optical signals to determine changes in vibrations.

9. The method as claimed in claim 1, wherein the subsea flowline comprises an oil pipeline or a gas pipeline.

\* \* \* \* \*